United States Patent
Murai

[11] Patent Number: 6,148,358
[45] Date of Patent: Nov. 14, 2000

[54] SEPARATELY-CONTROLLED MULTI-TASK COMPUTER SYSTEM

[75] Inventor: Nobuhiro Murai, Kakegawa, Japan

[73] Assignee: NEC Corporation, Tokyo, Japan

[21] Appl. No.: 09/093,338

[22] Filed: Jun. 9, 1998

[30] Foreign Application Priority Data

Jun. 9, 1997 [JP] Japan ................................. 9-151351

[51] Int. Cl.$^7$ ................................................ G06F 13/00
[52] U.S. Cl. ................................................ 710/129; 710/2
[58] Field of Search ................................. 709/208, 209, 709/210, 211; 710/1, 100, 6–7, 129, 2

[56] References Cited

U.S. PATENT DOCUMENTS

| | | | |
|---|---|---|---|
| 5,519,880 | 5/1996 | Okabayashi | 712/11 |
| 5,675,813 | 10/1997 | Holmdahl | 713/310 |
| 5,831,848 | 11/1998 | Rielly et al. | 364/132 |
| 5,922,053 | 7/1999 | Okada | 709/238 |
| 6,000,042 | 12/1999 | Henrie | 714/40 |

FOREIGN PATENT DOCUMENTS

| | | |
|---|---|---|
| 62-186350 | 8/1987 | Japan . |
| 63-68954 | 3/1988 | Japan . |
| 2-141157 | 5/1990 | Japan . |
| 3-162763 | 7/1991 | Japan . |
| 10-511795 | 11/1998 | Japan . |

*Primary Examiner*—Majid Banankhah
*Assistant Examiner*—Van Nguyen
*Attorney, Agent, or Firm*—Foley & Lardner

[57] ABSTRACT

A computer system is provided, by which USB devices or the like can be multi-task-operated. The system comprises a first input and output device for inputting and outputting data; a first controller for sending first control data and for controlling the first input and output device according to second control data; a second input and output device for inputting and outputting data; a second controller for sending the second control data and for controlling the second input and output device according to the first control data; and a relay device, provided between the first and second controllers, for relaying the first and second control data.

4 Claims, 2 Drawing Sheets

SEPARATELY-CONTROLLED MULTI-TASK COMPUTER SYSTEM

BACKGROUND OF THE INVENTION

1. Field of the Invention

The present invention relates to a computer system comprising a USB (universal serial bus) interface.

This application is based on Patent Application No. Hei 9-151351 filed in Japan, the contents of which are incorporated herein by reference.

2. Description of the Related Art

Typically, a conventional computer system comprising a USB interface includes an input device such as an image scanner or a mouse, a USB device (including an HUB) as an output device such as a printer or a display, and a USB host for controlling the operations of the USB device. That is, plural USB devices are connected to a USB host.

In the above structure, the operations of the plural USB devices are respectively controlled by the USB host.

In the conventional computer system, a USB host only controls the operations of USB devices which are connected to the host. Therefore, the USB host cannot control operations of other USB hosts or other USB devices connected to the other USB hosts. That is, in the conventional computer system, no interfacing means between plural USB hosts exists; thus, it has been impossible to multi-task-operate USB devices or the like among plural USB hosts.

SUMMARY OF THE INVENTION

In consideration of the above circumstances, the present invention has an objective to provide a computer system for multi-task-operating USB devices or the like.

Therefore, the present invention provides a computer system comprising: first input and output means for inputting and outputting data; first control means for sending first control data and for controlling the first input and output means according to second control data; second input and output means for inputting and outputting data; second control means for sending the second control data and for controlling the second input and output means according to the first control data; and relay means, provided between the first control means and the second control means, for relaying the first and second control data.

According to the above structure, the interface between the first and second control means is established by the relay means; thus, the first control means can control the second input and output means which functions as an independent device while the second control means can control the first input and output means which also functions as an independent device. Therefore, operations of the first input and output means and the second input and output means can be controlled in a multi-task form by using separate devices.

The above system typically comprises: a first computer including the first control means, the first computer being controlled according to the second control data; and a second computer including the second control means, the second computer being controlled according to the first control data.

In this case, in addition to the first and second input/output means, operations of the first and second computers can also be controlled in a multi-task form by using separate devices.

In a typical operation, the first control means is controlled according to the second control data, and the second control means is controlled according to the first control data.

In this case, in addition to the first and second input/output means and the first and second computers, operations of the first and second control means can also be controlled in a multi-task form by using separate devices.

DESCRIPTION OF THE PREFERRED EMBODIMENTS

First Embodiment

The embodiments of the present invention will be explained with reference to the drawings.

Figure 1:
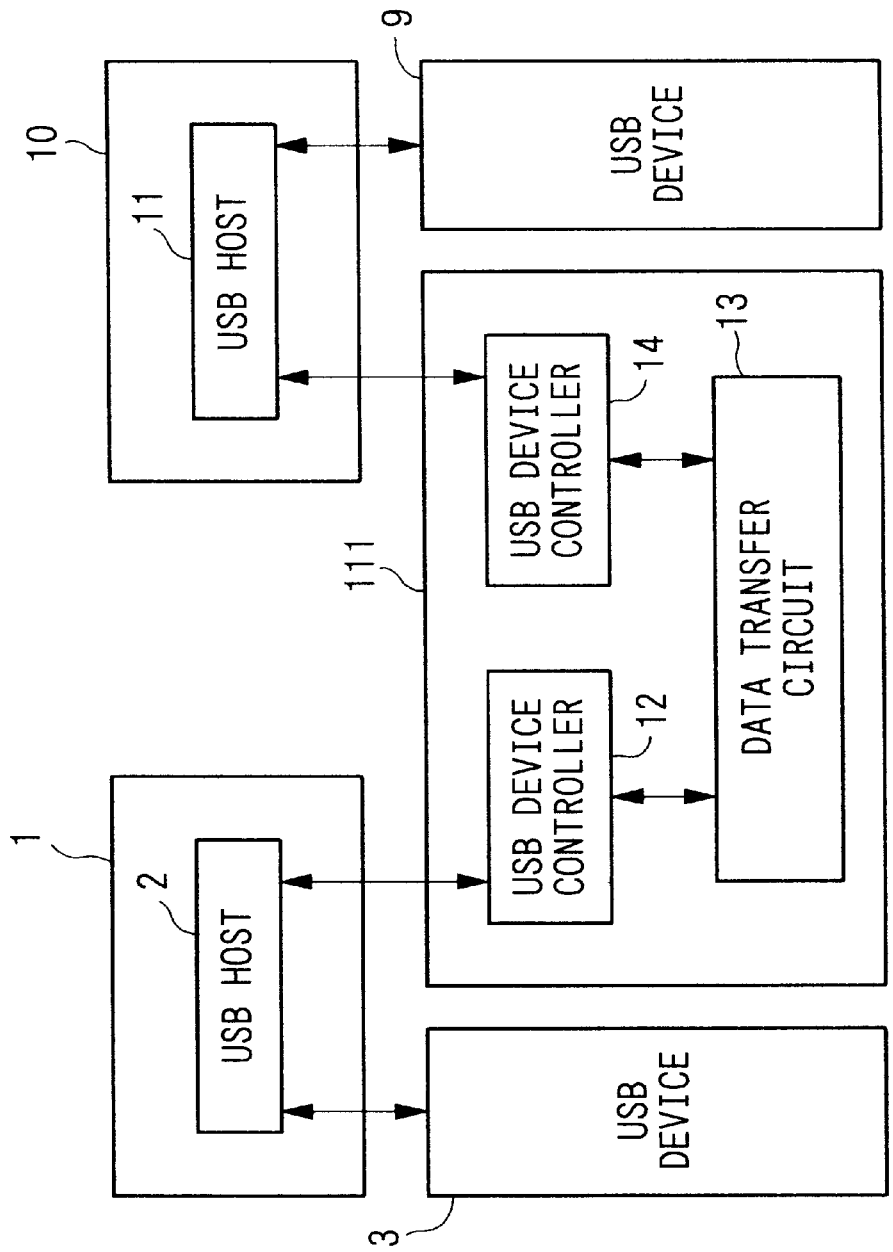
FIG. 1 is a block diagram showing a configuration of the computer system of the first embodiment according to the present invention.

FIG. 1 is a block diagram showing a configuration of the computer system of the first embodiment according to the present invention. In this figure, reference numeral 1 indicates a computer comprising a CPU (central processing unit), a ROM (read only memory), a RAM (random access memory), and the like (each not shown). Reference numeral 2 indicates a built-in USB host, provided in computer 1, which controls operations of USB device 3 and the like.

The USB host 2 sends first control data and receives second control data. The first control data are used for controlling operations of USB device 9, computer 10, and USB host 11, each explained later. The second control data are used for controlling operations of computer 1, USB host 2, and, USB device 3. Operations of the USB host 2 will be later explained in detail.

The USB device 3 includes plural input devices and plural output devices, and is connected to USB host 2.

Reference numeral 111 indicates a USB relay circuit unit for performing relay operations between USB host 2 and later-explained USB host 11. In this USB relay circuit unit 111, reference numeral 12 indicates a USB device controller which outputs the first control data input from USB host 2 to later-explained data transfer circuit 13 and which also outputs the second control data output from USB host 11 and input from the data transfer circuit 13. The USB device controller 12 is connected to USB host 2 via a USB interface (not shown) which is provided in computer 1.

Reference numeral 13 is a data transfer circuit, which transfers the first control data input from USB device controller 12 to USB device controller 14 and which also transfers the second control data input from USB device controller 14 to USB device controller 12.

USB device controller 14 outputs the first control data input from data transfer circuit 13, and outputs the second control data input from USB host 11 to data transfer circuit 13. This USB device controller 14 is connected to USB host 11 via a USB interface which is provided in computer 10.

Computer 10 is separately provided with respect to computer 1, and comprises a CPU, ROM, RAM, and the like (each not shown). USB host 11 is provided in computer 10, and controls operations of USB device 9, and the like. The USB host 11 sends the second control data to USB device controller 14, and also receives the first control data. USB device 9 includes input and output devices, similar to USB device 3.

Hereinafter, operations will be explained of the above computer system of the first embodiment.

Regarding FIG. 1, when the first control data is sent from USB host 2, the data is received by USB device controller 12 and is further received via data transfer circuit 13 and USB device controller 14 by USB host 11. In this way, USB host 11 controls operations of USB device 9 according to the first control data. In addition, operations of computer 10 are controlled according to the first control data. That is, operations of USB device 9, computer 10, and USB host 11 are controlled via USB relay circuit unit 111 by USB host 2 (i.e., by computer 1).

On the other hand, when the second control data is sent from USB host 11, the data is received by USB device controller 14 and is further received via data transfer circuit 13 and USB device controller 12 by USB host 2. In this way, USB host 2 controls operations of USB device 3 according to the second control data. In addition, operations of computer 1 are controlled according to the second control data. That is, operations of USB device 3, USB host 2, and computer 1 are controlled via USB relay circuit unit 111 by USB host 11 (i.e., by computer 10).

As explained above, according to the computer system of the first embodiment, USB relay circuit unit 111 is provided; thus, operations of the system from USB host 2 (i.e., computer 1) via USB relay circuit unit 111 to USB host 11, USB device 9, and computer 10 itself can be multi-task controlled.

Similarly, according to the computer system of the first embodiment, operations of the system from USB host 11 via USB relay circuit unit 111 to USB host 2, USB device 3, and computer 1 itself can be multi-task controlled.

Furthermore, according to the computer system of the first embodiment, the above-described multi-task operation can be realized with no special control circuit in computers 1 and 10. Therefore, according to the computer system of the first embodiment, with a computer having a USB interface, a multi-task operation can be performed by easily connecting USB relay circuit unit 111.

Second Embodiment

Figure 2:
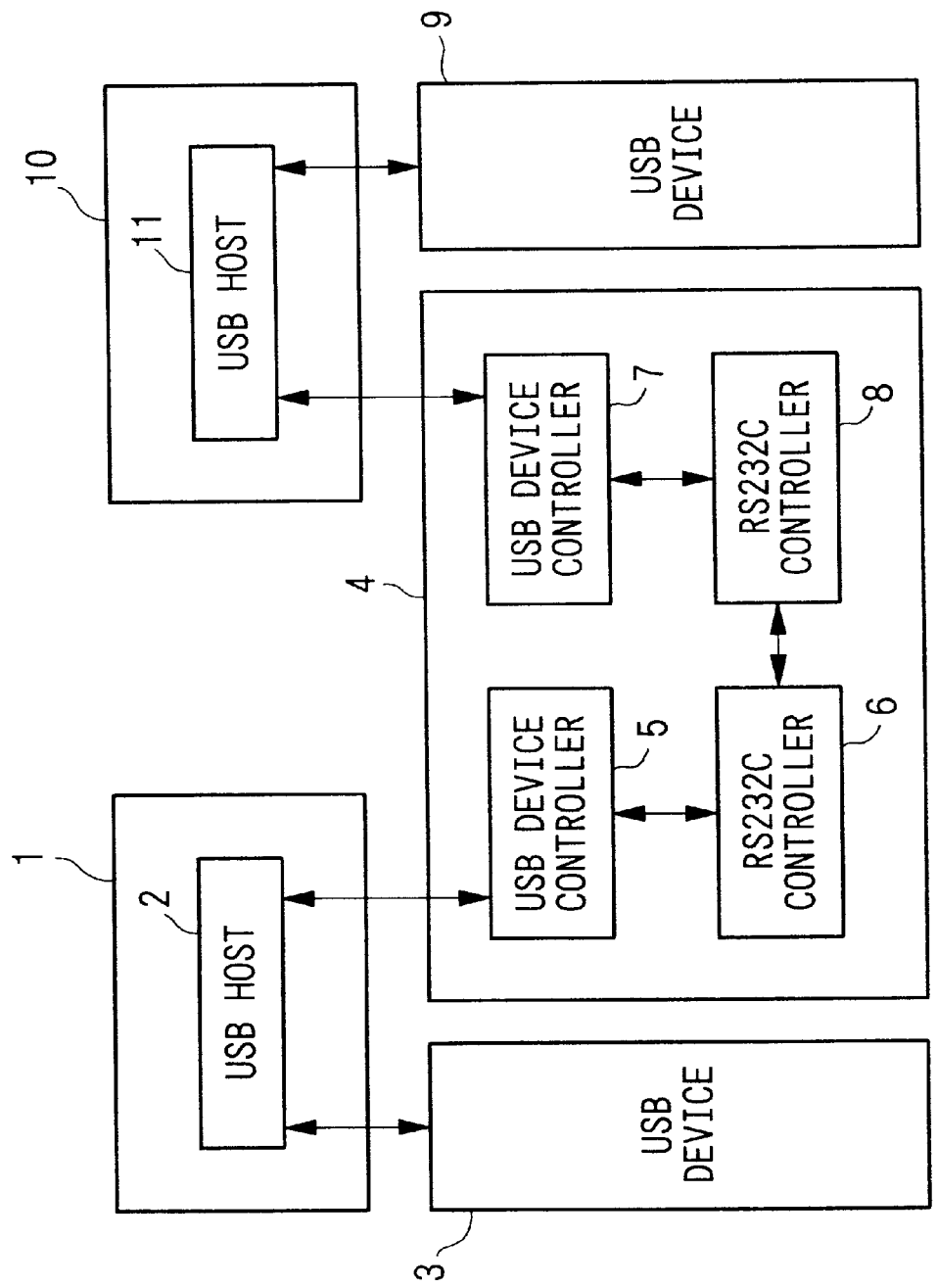
FIG. 2 is a block diagram showing a configuration of the computer system of the second embodiment according to the present invention.

FIG. 2 is a block diagram showing a configuration of the computer system of the second embodiment according to the present invention. In this figure, parts identical to those in FIG. 1 are given identical reference numerals and explanations thereof are omitted. In FIG. 2, USB relay circuit unit 4 is provided instead of USB relay circuit unit 111 in FIG. 1.

The USB relay circuit unit 4 is provided between USB hosts 2 and 11, and the basic functions of unit 4 are similar to those of USB relay circuit unit 111 (refer to FIG. 1). In USB relay circuit unit 4, reference numeral 5 indicates a USB device controller which receives the first control data sent from USB host 2 and also sends the second control data, which was sent from USB host 11, to USB host 2. The basic functions of this USB device controller 5 are similar to those of the above-explained USB device controller 12 (refer to FIG. 1).

Reference numeral 6 indicates an RS232C controller connected to USB device controller 5, which controls an interface (not shown) based on the RS232C standard. The RS232C controller 6 sends the first control data, which was sent from USB device controller 5, to RS232C controller 8, and also receives the second control data sent from RS232C controller 8.

The RS232C controller 8 is connected to USB device controller 7, and sends the first control data, which was sent from RS232C controller 6, to USB device controller 7, and also receives the second control data sent from USB device 7.

The USB device controller 7 receives the second control data sent from USB host 11, and also sends the first control data, which was sent from RS232C controller 8, to USB host 11. The basic functions of this USB device controller 7 are similar to those of the above-explained USB device controller 14 (refer to FIG. 1).

Hereinafter, operations of the above computer system of the second embodiment will be explained.

Regarding FIG. 2, when the first control data is sent from USB host 2, the first control data is received via USB device controller 5, RS232C controllers 6 and 8, and USB device controller 7 by USB host 11. In this way, USB host 11 controls operations of USB device 9 according to the first control data, similar to the above-mentioned operations of the first embodiment. Here, operations of computer 10 are controlled according to the first control data.

On the other hand, when the second control data is sent from USB host 11, the second control data is received via USB device controller 7, RS232C controllers 8 and 6, and USB device controller 5 by USB host 2. In this way, USB host 2 controls operations of USB device 3 according to the second control data. Here, operations of computer 1 are controlled according to the second control data.

The embodiments of the present invention has been explained in detail with reference to the drawings. Here, practical configuration is not limited to each embodiment and design modification within the scope of the present invention also belongs to the present invention.

For example, in the computer system of the above first embodiment, two computers 1 and 10, and two USB device controllers 5 and 7, are used; however, any number of computers or USB device controllers may be used.

Also in the computer system of the second embodiment, the number of such devices is not particularly limited.

In the computer system in the above second embodiment, two HUB controllers may be used instead of USB device controllers 12 and 14. In this case, USB devices 3 and 9 are respectively connected to the above two HUB controllers.

What is claimed is:

1. A computer system comprising;
   first input and output means for inputting and outputting data;
   first control means, having the USB (universal serial bus) interface, for sending first control data via the USB interface and for controlling the first input and output means according to second control data received via the USB interface;
   second input and output means for inputting and outputting data;
   second control means, having the USB interface for sending the second control data via the USB interface and for controlling the second input and output means according to the first control data received via the USB interface; and
   relay means, provided between the first control means and the second control means, for relaying the first control data from said first control means to said second control means, and for relaying said second control data in an opposite direction from said second control means to said first control means.

2. A computer system as claimed in claim 1, comprising:

a first computer including the first control means, the first computer being controlled according to the second control data; and a second computer including the second control means, the second computer being controlled according to the first control data.

3. A computer system as claimed in claim 1, wherein:

the first control means is controlled according to the second control data; and the second control means is controlled according to the first control data.

4. A computer system as claimed in claim 2, wherein:

the first control means is controlled according to the second control data; and the second control means is controlled according to the first control data.

* * * * *